United States Patent Office 2,839,578
Patented June 17, 1958

2,839,578
TREATMENT OF AROMATIC AMINO COMPOUNDS

Marshall R. Brimer, Kingsport, Tenn., assignor to Eastman Kodak Company, Rochester, N. Y., a corporation of New Jersey No Drawing. Application February 24, 1954
Serial No. 412,368

3 Claims. (Cl. 260—577)

This invention relates to an improved method of isolating and purifying certain aromatic amino compounds. More particularly this invention concerns a method involving crystallization for preparing certain dialkyl amino benzene type compounds in improved crystalline form.

A large number of methods and procedures have been described in the prior art showing various ways for isolating and purifying numerous organic compounds. For example, expired U. S. Patent No. 1,794,097 describes a method wherein organic solvents such as benzene, toluene, xylene, and the like are used in a purification process applied to certain aromatic amino compounds. In my own earlier U. S. Patent No. 2,279,385 I have described a process for removing colored impurities from phenylenediamine types of compounds using certain solvents. While prior art procedures have utility for certain purposes, heretofore in the isolation and purification of certain aromatic amino compounds it has not been possible to secure a finished product which was of substantially the desired crystalline size, free flowing and which had excellent bulk density, a high purity and other required properties. That is, when compounds of the class described herein were treated by prior art procedures, the aromatic amino compound resulting as a final product was in appearance more in the nature of a fine powdery material which was difficult to dry and had poor bulking properties.

It is therefore apparent that the development of improved procedures for isolating and purifying such aromatic amino compounds represents a highly desirable result. After extensive investigation following the work described in my earlier patent, aforementioned, I have found a method which may be applied to aromatic amino compounds of the type to be defined in detail herein, which method is not only relatively simple, but by which a very much improved product may be obtained.

This invention has for one object to provide an improved method for the treatment of aromatic amino compounds. Another object is to provide a method whereby such chemical compounds may be prepared in the form of crystalline product of high purity. Still another object is to provide a method for the isolation and purification of such compounds whereby the finished compound has excellent bulk density, is non-dusty, has a high purity, is readily dried, and may be stored without lumping. Another object is to provide a process of the type indicated wherein by varying certain elements of the process the physical properties of the resultant product may be altered in a predetermined manner. Still another object is to provide an isolation and purification method which is particularly adapted to the treatment of such type of compounds as amino diethyl aniline and amino diethyl toluene. Other such objects will appear hereinafter.

The aromatic amino compounds with which the present invention is particularly concerned are generically illustrated by the following structural formula:

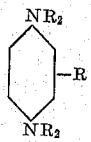

where R and $R_2$ are hydrogen or lower alkyl. Illustrative species of compounds under this generic formula are:

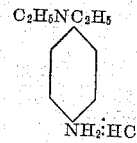

which amino compound for convenience herein will be referred to as "A–1," and

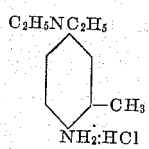

which specific amino compound for convenience herein will be referred to as "A–2." In these species illustrations I have shown the acid salt of the compound for convenience since by the above formulas I contemplate either the free compound or its salts.

As indicated above, when such type of compounds have been processed in accordance with the prior art, using various solvents such as benzene, acetone and the like, from which crystallization has been attempted, there has produced in many instances products more of a fine powdery nature rather than a well-defined crystalline product as is desired.

I have found that if crude, partially purified amino compounds of the class indicated are treated with certain mixtures of solvents and otherwise processed in accordance with the steps of the present invention as will be described in detail herein, that not only is it possible to produce a crystalline type of product, but the crystal size and certain other characteristics of this product may be controlled. That is, by operating my process as will be set forth in detail hereinafter, it is possible by predetermining the conditions, to produce the product either in a fine crystalline state or in a coarser crystalline state.

In general my process comprises dissolving the compound to be purified in a solvent mixture. It is to be noted that the use of a mixture of solvents appears to have an important bearing on the process. A very useful solvent mixture comprises benzene and isopropanol as will be noted from specific examples set forth hereinafter. Aqueous inorganic acid is then added in equivalent proportions to produce the salt of the organic compound. For example, aqueous hydrochloric acid is very satisfactory for obtaining the hydrochloride salt. A crystallization grade of 31–38% of aqueous hydrochloric acid which is less expensive than more concentrated solutions, functions very satisfactorily. The acid salts of the organic compounds of the class described are wholly or partially soluble in the resultant ternary mixture of water, hydrocarbon solvent and alcohol solvent. However, upon heating this mixture the water may be azeotroped off, thus drying the solvent. The azeotrope, as for example benzene-isopropanol-water, is condensed and the solvent layer is decanted and returned to the process. By this method of water removal the power of the mixture of solvents to dissolve the aromatic amino compound salt, is reduced and pure crystals of the chemical are formed at about the boiling point of the solvent.

I have discovered that this crystal formation may be caused to begin after the removal of approximately two-thirds of the water. Therefore, by controlling the contents and proportions of the water and solvent, a very convenient and desirable way is provided for obtaining crystal formation of the organic compound as desired.

A further understanding of my invention will be had from a consideration of the following examples which are set forth to illustrate certain preferred embodiments of my invention, and are not to be considered as undue limitation thereupon.

*Example I*

In accordance with this example, the aromatic compound treated was one known as para-amino diethyl aniline, having a formula the same as A-1 set forth above. Approximately 525 pounds of this material was incorporated in a liquid comprised of 500 pounds benzene, 500 pounds isopropanol and 380 pounds of 31% crystal grade hydrochloric acid. This A-1 compound went into solution quite readily. The resultant batch was heated in a small distillation apparatus to reflux and approximately 262 pounds of water removed azeotropically. The azeotrope which came off, made up of the mixed solvent plus the water, was condensed and decanted in order to separate the solvent, which solvent was returned as reflux.

After the removal of the amount of water aforementioned, the batch was cooled, filtered and washed. It will be noted that crystals were formed in the cooled batch, which crystals, after separation by filtering, were vacuum dried to remove solvent and any water remaining. In the washing step dry solvent may be used and the washing and vacuum drying carried out one or more times as may be desired. Approximately 600 pounds of large white crystals of chemical compound A-1 were obtained. These crystals were of such a quality that they were as free flowing as common table salt. They had excellent bulk density, a very high purity, and were readily dried by the drying step aforementioned. Also, upon storage of the crystals over an extended period, no or negligible lumping occurred.

*Example II*

The procedure specified above in Example I was repeated, except that no water was removed by azeotropic distillation. The batch was cooled, filtered, and washed as specified above. A finer crystal than previously found was obtained, in a yield of only 390 pounds.

*Example III*

In accordance with this example, 105 parts of the para-amino diethyl aniline compound to be treated were incorporated into liquid made up of 160 parts of isopropanol, 80 parts of benzene and 58 parts of 38% hydrochloric acid (all parts are by weight). As in the preceding examples, the batch was refluxed until water was removed. In this example most of the water was removed. The batch was then cooled to approximately 5° C., filtered, washed and vacuum dried. Approximately 106 parts of product were obtained. This represented 90% recovery. The crystals which were obtained were white needles quite similar in appearance to hydroquinone. It can be seen from this example that by varying the composition of the mixed solvent, a different type of crystal may be obtained.

*Example IV*

In accordance with this example, 105 parts of the same chemical compound as in the preceding examples were incorporated into liquid. The liquid in this example was comprised of 160 parts of benzene, 80 parts of isopropanol and 58 parts of 37% hydrochloric acid. It will be observed in this example that the hydrocarbon component of the solvent was substantially in excess of the alcohol component. Mixed solvent and water were removed azeotropically and some of the decanted solvent returned as in the preceding examples. After removal of a substantial part of the water, the batch was cooled, filtered, washed and vacuum dried. In this example the product came out in large chunks or pieces, more in the nature of crystal aggregates. In accordance with the more preferred emboiments of this invention, products formed as in the preceding examples would usually be preferred for most uses rather than the large pieces of this example.

*Example V*

In accordance with this example, 100 parts of the raw chemical compound to be treated were used. The chemical had a formula in accordance with A-2 above and was comprised of para-amino diethyl toluene. The 100 parts was incorporated into a liquid made up of 160 parts of isopropanol, 80 parts of benzene and 55 parts of 37% hydrochloric acid (parts by weight). As in the preceding examples, the batch was refluxed until substantially all, or the greater part, of the water was removed. The azeotrope refluxed off was condensed and decanted as already described. After removal of the water, the batch was cooled, filtered, washed and vacuum dried. One hundred and three parts of product, consisting of very large white crystals were obtained. Here again these crystals were dustless and of high purity, flowed readily and were otherwise satisfactory for use or storage.

As may be seen from the above examples, I have provided a relatively simple method by which either crude or partially purified aromatic amino compounds of the type described may be converted to high purity crystalline products. The crystals of the type obtained by the procedure of Example I are particularly useful industrially in that they may be packaged and stored for long periods without caking trouble. They may be readily poured from containers inasmuch as the crystals flow in a free and uniform manner.

It can be further seen from the above examples that the exact size and the like characteristics of the crystals may be controlled in a predetermined manner by the choice of the solvent mixture. That is, when the hydrocarbon component of the solvent mixture is higher, within limits, than the alcohol component, the tendency is toward larger final product size. As will be noted from Example IV, the product can be obtained even in large pieces, although generally I prefer to make the aromatic amino compounds in the form of medium or fine crystals. On the other hand, when the alcohol component of the solvent mixture is equal to or greater than the hydrocarbon component, the crystal size is from medium to small.

An alternate method of controlling crystal size involves controlling the amount of water removed. This method is limited by the desirability of removing most of the water to obtain high yield.

The cooling may be below room temperature, say between 0° and 20° C.

While in the above description the crystals have been described as separated by filtration, they can be separated by centrifuging or the like procedure.

In place of hydrochloric acid for forming the salt of the compound, I may use other acids, such as sulfuric acid.

In place of isopropanol I may use normal propanol and other alcohols, such as n-butyl alcohol.

In place of benzene I may use toluene or hexane.

My process is particularly useful for the treatment of alkyl substituted amino benzene types of compounds as has been described in detail above.

I claim:

1. A process for treating an aromatic amino compound from the group consisting of amino diethyl aniline and amino diethyl toluene to obtain the compound in crystalline form, which comprises incorporating the compounds into a mixed solvent of hydrocarbon and alcohol, the hydrocarbon being from the group consisting of benzene, toluene and hexane and the alcohol being from the group consisting of isopropanol, normal propanol and normal butyl alcohol, also incorporating aqueous hydrochloric acid with the aforementioned ingredients for converting the compound to the hydrochloride, subjecting the aforementioned ingredients to distillation with reflux whereby a substantial portion of any water present is removed as an azeotrope of the solvent and water, separating water from the solvent, returning at least a part of the separated solvent to said distillation and after the removal of a substantial portion of the water as aforementioned, cooling the constituents whereby crystals of the aromatic amino compound form, separating the crystals and washing and drying them whereby a relatively pure, free-flowing product is obtained.

2. The process in accordance with claim 1 wherein the quantity by weight of the mixed solvent is greater than the quantity of the compound from the group consisting of amino diethyl aniline and amino diethyl toluene incorporated therein.

3. The process in accordance with claim 1 wherein the hydrocarbon component of said mixed solvent is benzene and the alcohol component is isopropanol.

References Cited in the file of this patent

UNITED STATES PATENTS

| | | |
|---|---|---|
| 1,794,097 | Weiland et al. | Feb. 24, 1931 |
| 1,989,541 | Blanchod | Jan. 29, 1935 |
| 2,187,820 | Lecher | Jan. 23, 1940 |
| 2,279,385 | Brimer | Apr. 14, 1942 |
| 2,517,276 | Bassford et al. | Aug. 1, 1950 |
| 2,691,624 | Challis | Oct. 12, 1954 |

OTHER REFERENCES

Perry: "Chem. Engineers Handbook" (1950), 3rd ed., p. 634.